US006664987B1

United States Patent
Tarbox et al.

(10) Patent No.: US 6,664,987 B1
(45) Date of Patent: Dec. 16, 2003

(54) SYSTEM FOR DISPLAYING A COMPUTER MANAGED NETWORK LAYOUT WITH TRANSIENT DISPLAY OF USER SELECTED ATTRIBUTES OF DISPLAYED NETWORK OBJECTS

(75) Inventors: Brian James Tarbox, Littleton, MA (US); Bethany Rose Scaer, Nashua, NH (US); Jeffrey Phillip Snover, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 08/971,255

(22) Filed: Nov. 17, 1997

(51) Int. Cl.[7] ................................................. G09G 5/00
(52) U.S. Cl. ....................... 345/853; 345/805; 345/854; 709/223; 709/224
(58) Field of Search ................................ 345/349, 969, 345/348, 356, 970, 353, 346, 839, 835, 853, 841, 804, 805; 395/200.53, 200.54; 709/223, 224

(56) References Cited

U.S. PATENT DOCUMENTS

| 5,295,244 A | 3/1994 | Dev et al. ................... 395/161 |
|---|---|---|
| 5,353,399 A | 10/1994 | Kuwamoto et al. .......... 395/159 |
| 5,471,399 A | 11/1995 | Tanaka et al. ............... 364/491 |
| 5,483,631 A * | 1/1996 | Nagai et al. ................. 345/329 |
| 5,684,988 A * | 11/1997 | Pitchaikani et al. ......... 707/104 |
| 5,742,768 A * | 4/1998 | Gennaro et al. ........ 395/200.33 |
| 5,751,965 A * | 5/1998 | Mayo et al. ........... 395/200.54 |
| 5,764,913 A * | 6/1998 | Jancke et al. .......... 395/200.54 |

* cited by examiner

Primary Examiner—John Cabeca
Assistant Examiner—Cuong T. Thai
(74) Attorney, Agent, or Firm—Jerry B. Kraft; Jeffrey S. LaBaw

(57) ABSTRACT

A computer managed communication network with user interactive access via a plurality of display terminals and including a plurality of network objects, each respectfully associated with one of a plurality of linked network nodes. The network includes means such as databases for storing data representing attributes of network objects. There is graphically displayed on at least one of said display terminals, at least a portion of said linked network nodes and associated objects. In addition, there is a user interactive implementation for activating a transient display of a selected attribute of one of said displayed objects proximate to said object in combination with user interactive means for selecting the attribute to be transiently displayed. Preferably, the attribute is dynamically selected by user interactive means for activating the display of an attribute menu during the time of said transient display so that another attribute may be selected during said time.

18 Claims, 13 Drawing Sheets

SYSTEM FOR DISPLAYING A COMPUTER MANAGED NETWORK LAYOUT WITH TRANSIENT DISPLAY OF USER SELECTED ATTRIBUTES OF DISPLAYED NETWORK OBJECTS

CROSS-REFERENCE TO RELATED COPENDING PATENT APPLICATIONS

The following two patent applications which have the same inventorship as the present invention and are assigned to a common assignee cover subject matter related to the subject matter of the present invention: A SYSTEM FOR DISPLAYING A COMPUTER MANAGED NETWORK LAYOUT WITH A FIRST TRANSIENT DISPLAY OF A USER SELECTED PRIMARY ATTRIBUTE OF AN OBJECT AND A SUPPLEMENTARY TRANSIENT DISPLAY OF SECONDARY ATTRIBUTES, R. R. Scaer et. al., (Ser. No. 08/972,052), and A SYSTEM FOR DISPLAYING A COMPUTER MANAGED NETWORK LAYOUT WITH VARYING TRANSIENCE DISPLAY OF USER SELECTED ATTRIBUTES OF A PLURALITY OF DISPLAYED NETWORK OBJECTS, R. R. Scaer et. al., (Ser. No. 08/971,252)

TECHNICAL FIELD

The present invention relates to computer managed communication networks and particularly to computer controlled user interactive display terminals for graphically displaying portions of such networks including linked nodes and associated network objects.

BACKGROUND OF THE INVENTION

The 1990's decade has been marked by a societal technological revolution driven by the convergence of the data processing industry, the communications industry and the consumer electronics industry. This advance has been even further accelerated by the extensive consumer and business involvement in the internet over the past two years. As a result of these changes, it seems as if virtually all aspects of human endeavor in the industrialized world will potentially involve human-computer interfaces, and especially such interfaces to communication networks such as the internet. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers, workers and business people to be involved in computer interfaces. In addition because of the vast amount of information potentially available through networks such as the internet, there has been an increasing demand on the part of relatively sophisticated users for implementations which make display terminal access to the internet less cluttered and confusing and of course easier to use.

The present invention is directed to the problems of providing less cluttered and easier graphical display access to communication network nodes, objects associated with such nodes, as well as the attributes of such objects. In solution of such problems, it makes use of transient displays in which user selected attributes of such nodes and objects may be displayed.

In the past, transient displays have been used effectively in connection with user interactive graphical interfaces to computer functions which use interfaces utilizing icon arrays. For simplicity and ease of use, such icons may not have adjacent alphanumeric descriptors. However, in order to help new users to become familiar with the icon functions, some recent interface systems have been set up so that if the user via his mouse or otherwise controlled cursor hovers on or near an unmarked icon, there will appear a transient display of the icon descriptor.

SUMMARY OF THE INVENTION

The present invention relates to a computer managed communication network with user interactive access via a plurality of display terminals and including a plurality of network objects, each respectfully associated with one of a plurality of linked network nodes. The network includes means such as databases for storing data representing attributes of network objects. Means are provided for graphically displaying on at least one of said display terminals, at least a portion of said linked network nodes and associated objects. In addition, there is provided user interactive means for activating a transient display of a selected attribute of one of said displayed objects proximate to said object in combination with user interactive means for selecting the attribute to be transiently displayed. Preferably, the attribute is dynamically selected by user interactive means for activating the display of an attribute menu during the time of said transient display so that another attribute may be selected during said time.

It should be noted that the stored data representing the object attributes is not necessarily stored static data. The data storage means for providing the selected attribute may be dynamic i.e., the selected data attributes may be calculated when selected or it may be dynamically combined from several databases.

In accordance with another aspect of this invention, means are provided for displaying the selected attribute of said transient display in a portion of said display apart from said transient display and beyond the duration of said transient display. This additional display may be maintained until another transient display of an object is activated.

The system of the present invention may further include means for sorting said displayed network objects according to the value of a selected attribute whereby the said transient display may be activated for said displayed network objects in the order of said sort.

DETAILED DESCRIPTION OF THE PREFERRED EMBODIMENTS

Figure 1:
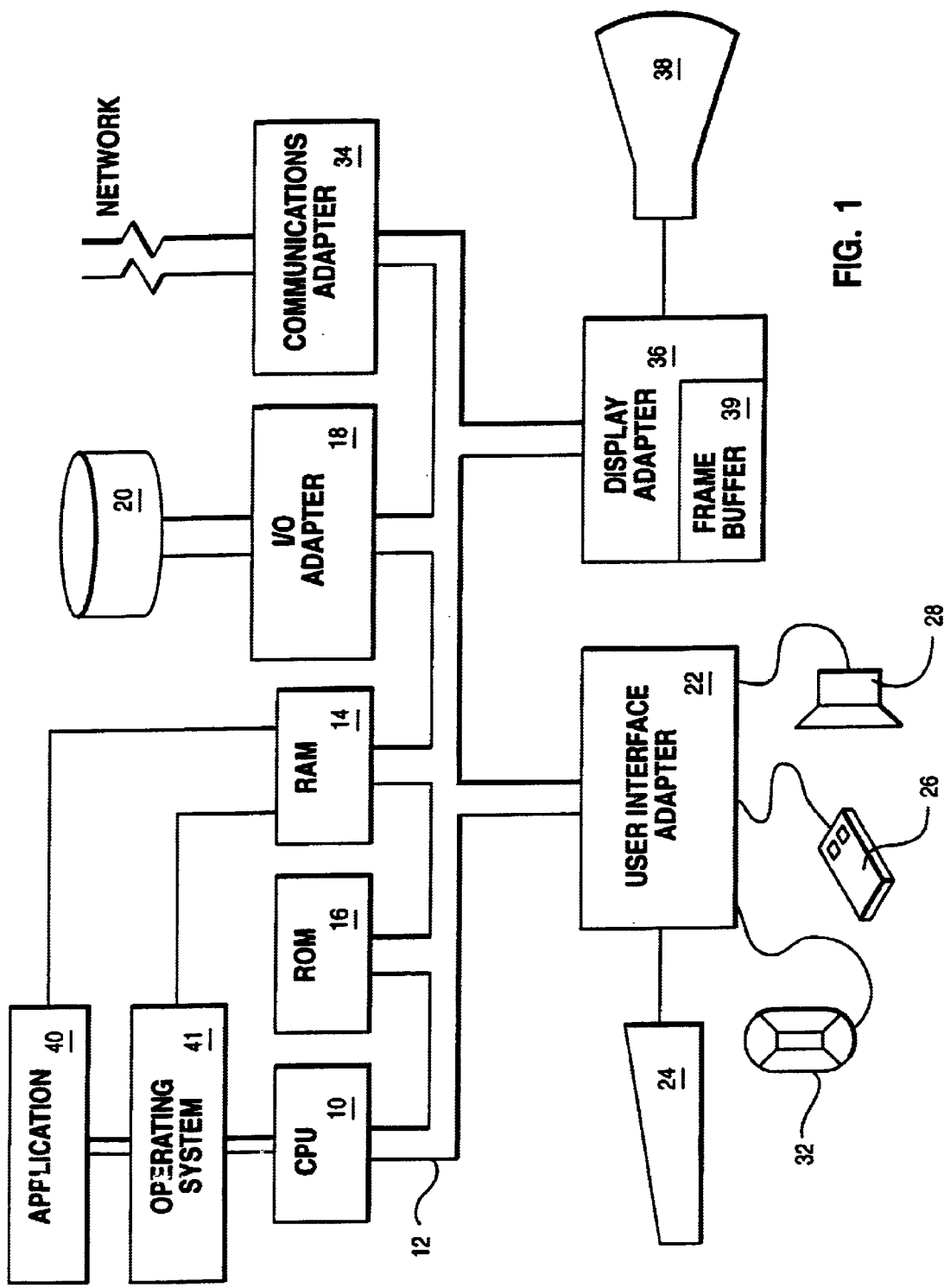
FIG. 1 is a block diagram of a data processing system including a central processing unit which is capable of implementing the transient display of the present invention.

Before going into the details of specific embodiments, it will be helpful to understand from a more general perspective the various elements and method which may be used to implement the present invention. Since the present invention is directed to transient display expedients to improve the user-friendliness of graphical display interfaces to network object attributes, we will not go into great detail in describing the networks to which the present invention is applicable. U.S. Pat. No. 5,295,244, Dev et al. and U.S. Pat. No. 5,353,399, Kuwamoto et al. adequately detail conventional networks to which the present invention would be applicable including appropriate network management and display terminal access to such networks. Reference has also been made to the applicability of the present invention to a global network such the internet. For details on internet nodes, objects and links, reference is made to the text, *Mastering the Internet*, G. H. Cady et al., published by Sybex Inc. Alameda, Calif., 1996.

Any data communication system which interconnects or links computer controlled systems or network objects at various sites or network nodes defines a communications network. A network may be as simple as two linked computers or it may be any combination of LANS (Local Area Networks) or WANS (Wide Area Networks). Of course, the internet is a global network of a heterogeneous mix of computer technologies and operating systems. At each level in a network hierarchy, the unit may considered as a network object. For example, since the internet connects networks of computers, a particular corporate network could be an internet object. Then the particular LAN of each department in the corporate network would be an object. At high levels, regional networks representative of cities could be objects. Likewise, computer controlled objects could be linked together by function to form networks which in turn could be linked into the internet backbone as network objects characterized by functions as accounts receivable/payable or video-on-demand distribution. Higher level objects are linked to the lower level objects in the hierarchy through a variety of network server computers. For example a video-on-demand distribution network could comprise several video server repository sites each having its unique collection of stored films; each of the sites would be network objects and the video distribution network itself would be an object on the internet. Of course at each level in the hierarchy, each object is associated with its own node.

In the subsequent, more specific descriptions of the preferred embodiment, the attributes and the storage of attributes will be discussed. It will be understood that the data representing particular object attributes or the data from which such particular attributes may be calculated dynamically may be stored in association with the object itself, a computer server managing the object or in a broad database associated with the overall network management.

In addition, for convenience in description of the operation of the various transient display implementations of the present invention, some simple object attributes may be used. It will be understood, that the implementations should be equally applicable in the reading of more complex attributes.

Referring to FIG. 1, a typical data processing system is shown which may function as the computer controlled display terminal used in implementing the transient display functions in the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A programming system application 40 to be subsequently described in detail runs in conjunction with operating system 41 and provides output calls to the operating system 41 which implement the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN) which includes of course the internet. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the transient displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment which will be subsequently described, the mouse will be the input means through which the user will interface with the system. The display terminal of FIG. 1 communicates with the network such as the internet through communications adapter 34.

Figure 2:
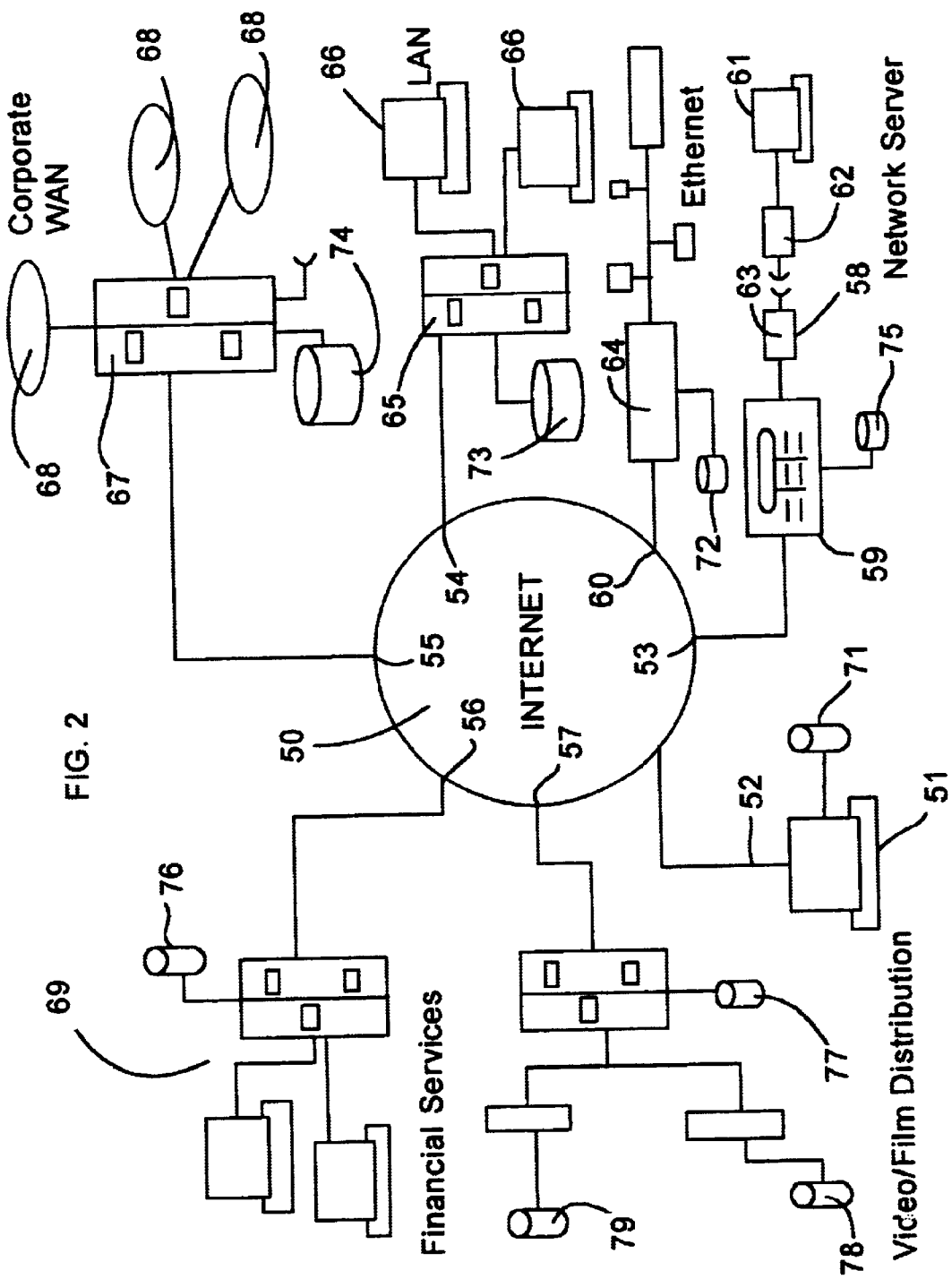
FIG. 2 is a generalized diagrammatic view of an internet portion upon which the present invention may implemented.

A generalized diagram of a portion of an internet to which the computer controlled display terminal 51 used for the transient display of the present invention is connected is shown in FIG. 2. Terminal 51 is the computer system shown in FIG. 1 and connection 52 (FIG. 2) is the network connection shown in FIG. 1. Some typical major objects connected to the net are user network 58 connected through server 59 at node 53. In such a server network, the individual users' workstations 61 are connected through telephone modems 62 and 63 to the server 59. Of course at the next level, each of the user workstations 61 may be considered as network objects. Among the other illustrative network objects are ethernet 64 at node 60 and a LAN at node 54 consisting of server 65 and workstations 66. At node 55, the connected object is a corporate WAN consisting of network server 67 and sub-networks 68. In addition, functional networks such as financial services network 69 and video/film distribution network 70 may be considered as objects, respectively connected at nodes 56 and 57. It should be noted that a variety of databases, 71 through 79 are shown respectively associated with network objects at various levels. These databases represent the various locations and repositories at which attributes and attribute values which may be transiently displayed in accordance with the present invention are stored. Thus, when the obtaining or fetching of attributes values are subsequently described, it should be understood that they may be obtained from such databases or combination of databases throughout the network using any conventional network expedient for obtaining data.

There will now be described a simple illustration of the present invention with respect to the display screens of FIGS. 3 through 10. When the screen images are described, it will be understood that these may be rendered by storing an icon creation program such as those in Windows 95 or OS-2 operating systems in the RAM 14 of the system of FIG. 1. The operating system is diagrammatically shown in FIG. 1 as operating system 41.

An embodiment of the present invention will be described commencing with the display screen shown in FIG. 3. This initial display screen is presented to the viewer on display monitor 38 of FIG. 1. In accordance with conventional techniques, the user may control the screen interactively through a conventional I/O device such as mouse 26 of FIG. 1 which operates through user interface 22 to call upon programs in RAM 14 cooperating with the operating system 41 to create the images in frame buffer 39 of display adapter 36 to control the display on monitor 38.

Figure 3:
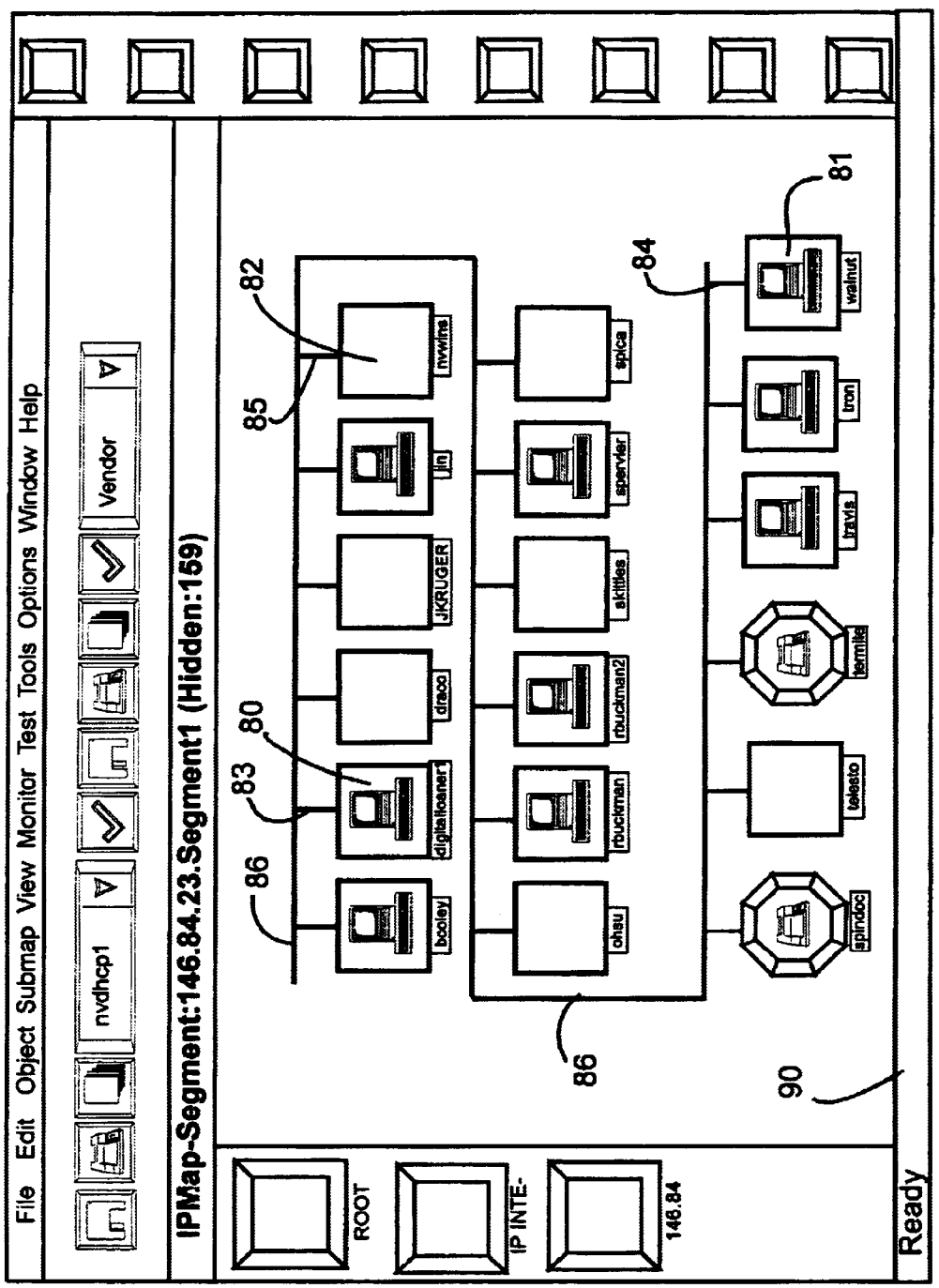
FIG. 3 is a diagrammatic view of a display screen on which a network portion is graphically represented.

The initial display screen of FIG. 3 shows a graphic representation of a portion of a network in which network objects are represented as icons such as objects 80, 81, and 82 respectively connected at node representations 83, 84 and 85 to network bus representation 86.

Figure 4:
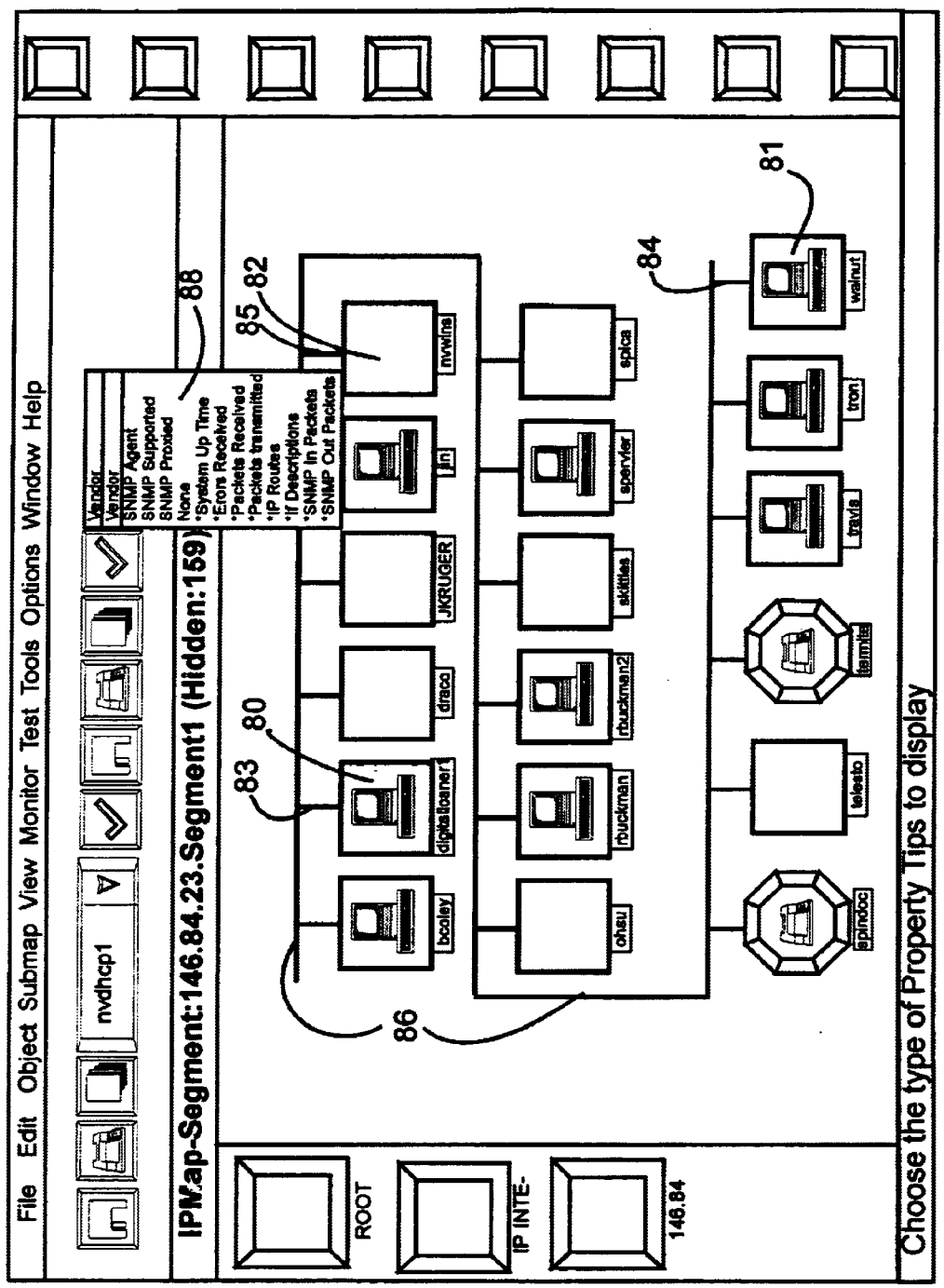
FIG. 4 is the display screen view of FIG. 3 with an interactive menu for selecting attributes to be displayed transiently.

In the display screen shown in FIG. 4, an attribute is selected by clicking on attribute window 87 by a user interactive I/O device such as mouse 26, FIG. 1. This brings down attribute menu 88, from which the user selects the attribute which in the present case is "vendor". Now, the user must select one of the objects so that the programming process may fetch an attribute value for that object. With reference to the same display screen shown in FIG. 5, the user has made a selection of object 80 by moving his cursor in a gesture not shown under control of mouse 26, FIG. 1 to the object 80. In the present control system, this selection gesture merely involved hovering (maintaining the cursor without clicking the mouse) in the vicinity of object icon 80 for a brief time period set by the program. As a result, the vendor attribute value, i.e., "DEC" appears in the transient display area 89. As will be hereinafter described with respect to the flowcharts of FIGS. 11 and 12, this value may obtained from any appropriate database 71–79 in FIG. 2 or it may be dynamically calculated from data in one or more of these databases or it may be retrieved from the node via a network request. The system program uses conventional means for setting the time that the transient display 89 will be on. If the display system needs the attribute and its value beyond the time of the transient display, a secondary display area 90 may be set up to retain this information until either a subsequent object, attribute or attribute value is developed or chosen.

Figure 6:
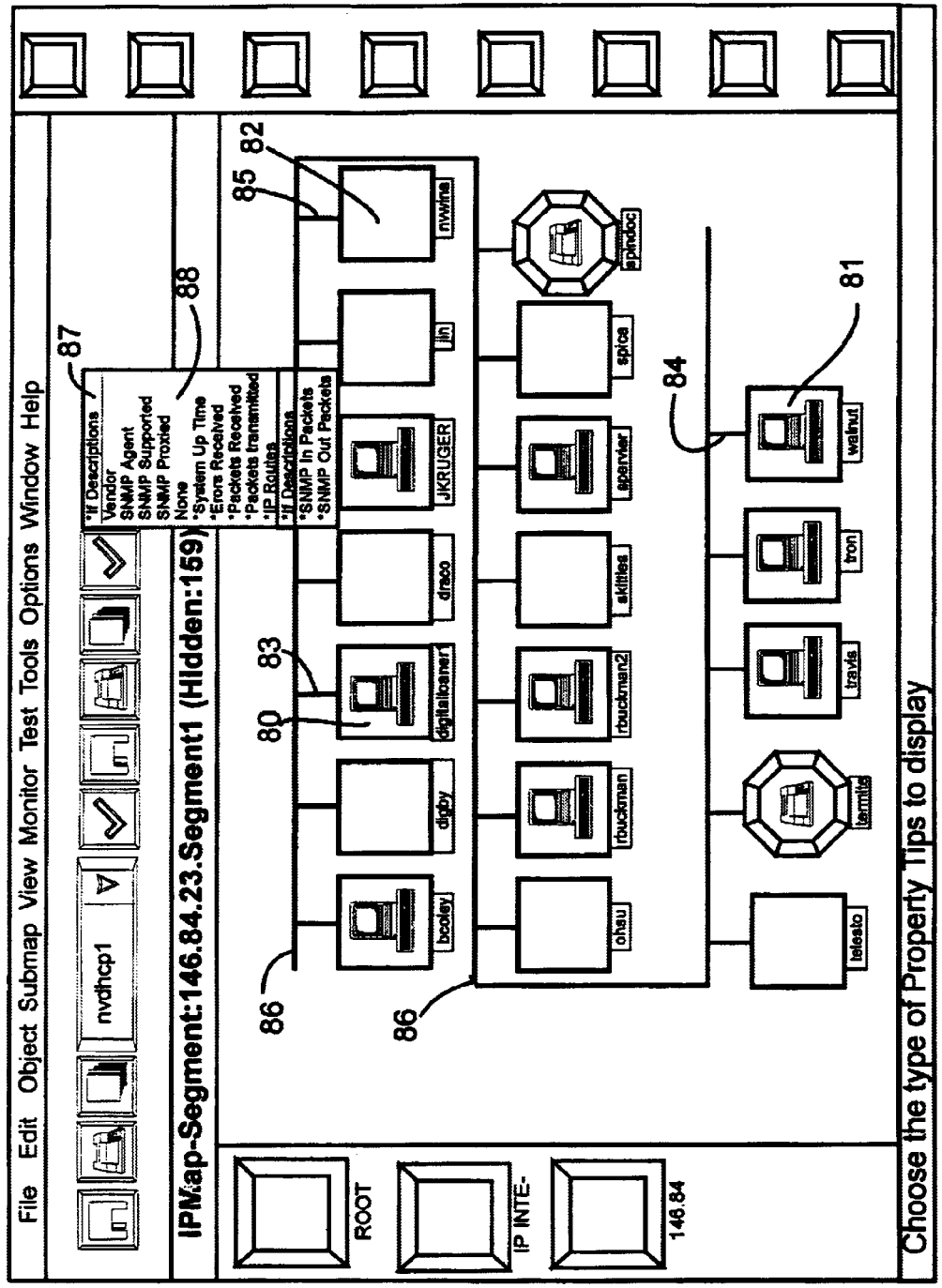
FIG. 6 is the display screen of FIG. 5 after the transient display with a menu from which the next attribute may be selected.
Figure 7:
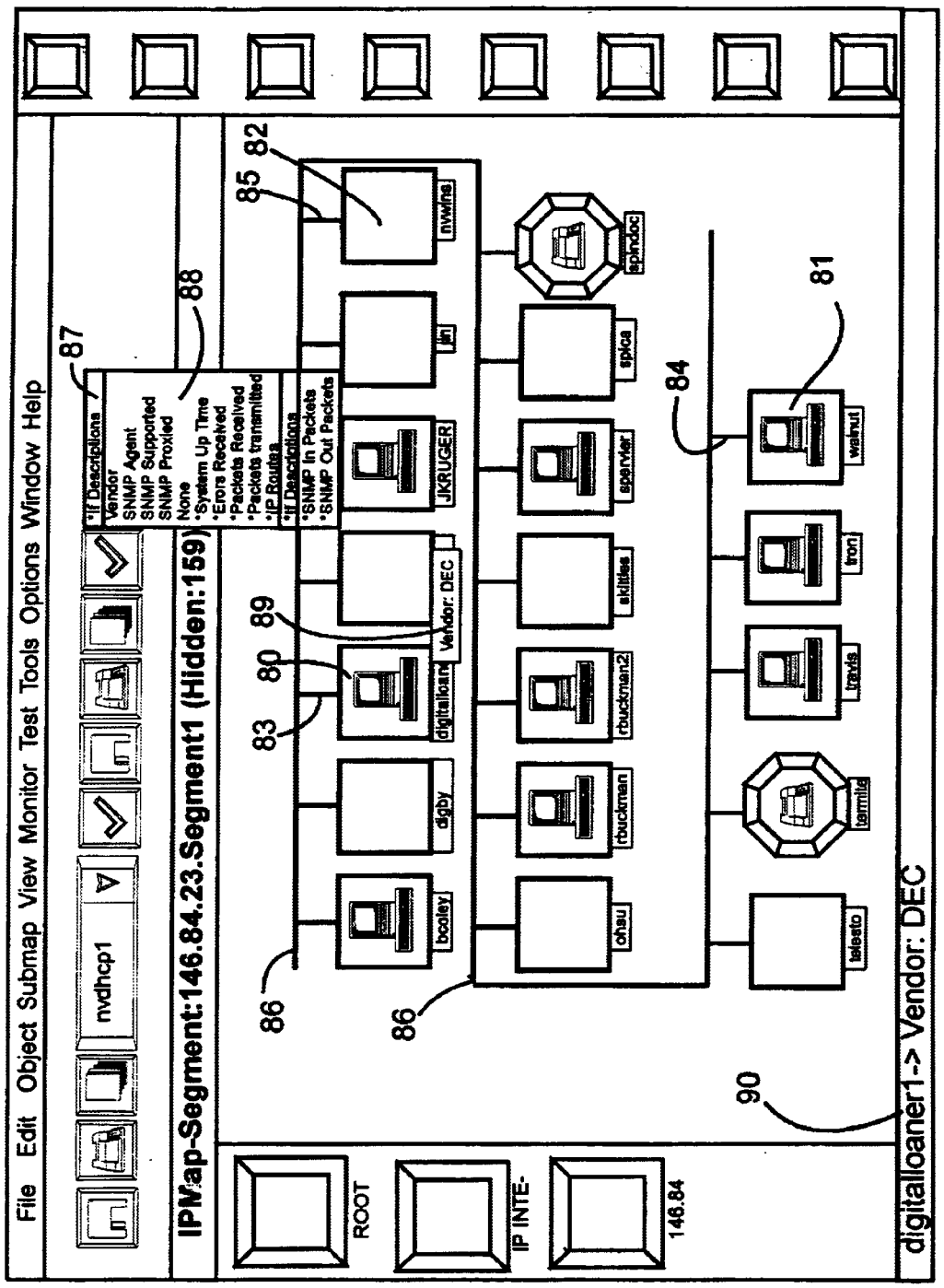
FIG. 7 is the display screen of FIG. 5 but with the menu from which the next attribute is to be selected and displayed during the previous transient display.

Now, with reference to FIGS. 6 and 7, there will now be described the selection of a subsequent attribute for transient display. In the display screen of FIG. 6, a new attribute is selected by clicking on attribute window 87 to bring down menu 88 from which the attribute "if descriptions", interface descriptions is selected. The display screen of FIG. 7 serves the same function as that of FIG. 6 except that the time of the transient display of the previous attribute value 89 is such that it is retained during the selection of the next attribute and value in a dynamic manner until as shown in the next screen of FIG. 8, it is replaced in transient display 89 by the subsequently selected interface attribute and value. When the program is operated in this fashion, once an object is selected, it is possible to run through a sequence of attributes and values for it dynamically without the transient display box terminating or disappearing between selections.

Figure 9:
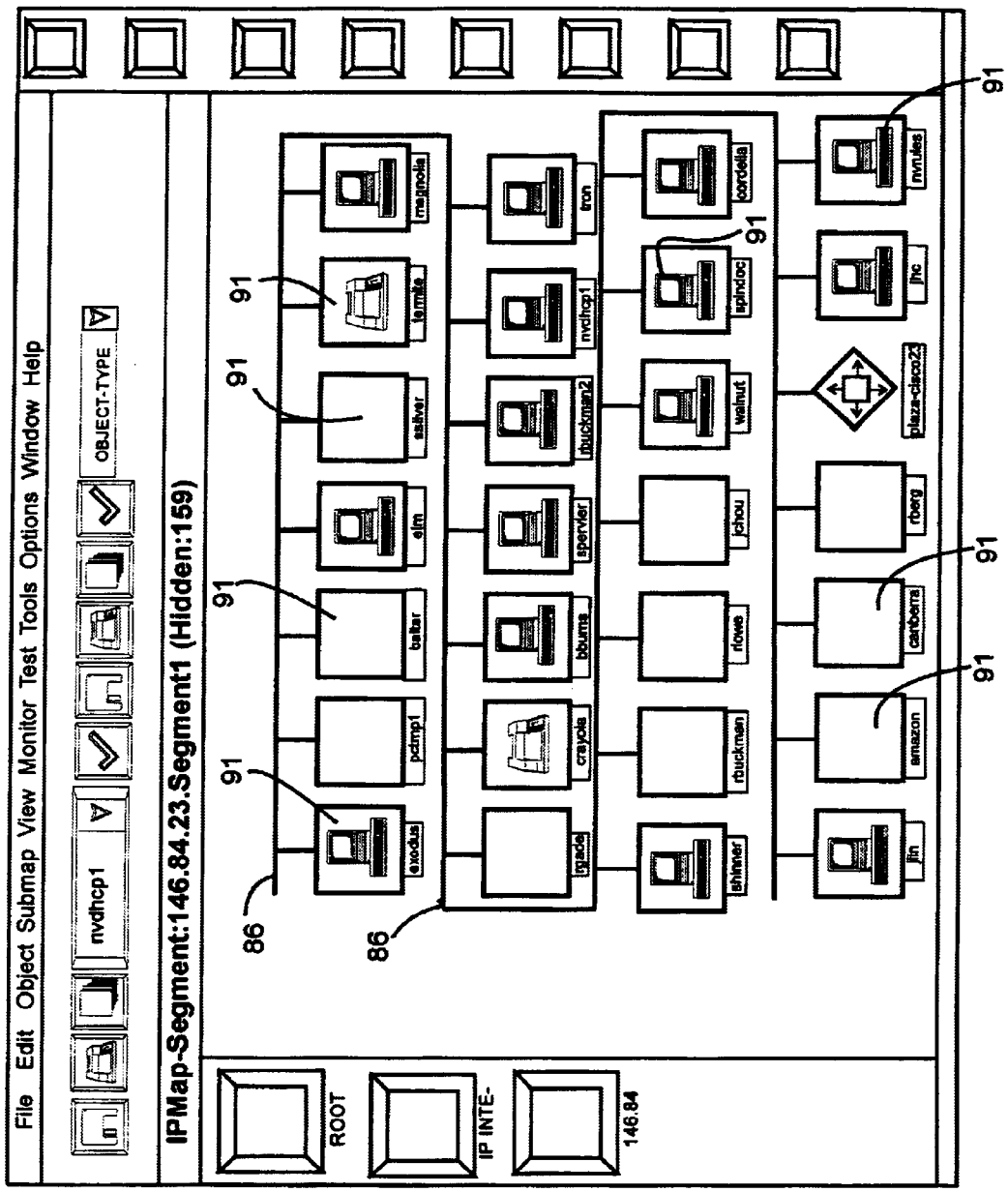
FIGS. 9 and 10 are display screens like that of FIG. 3 to illustrate an object sort routine with FIG. 9 representing the screen before a sort based on the object-type attribute, and FIG. 10 representing the screen after the sort.
Figure 10:
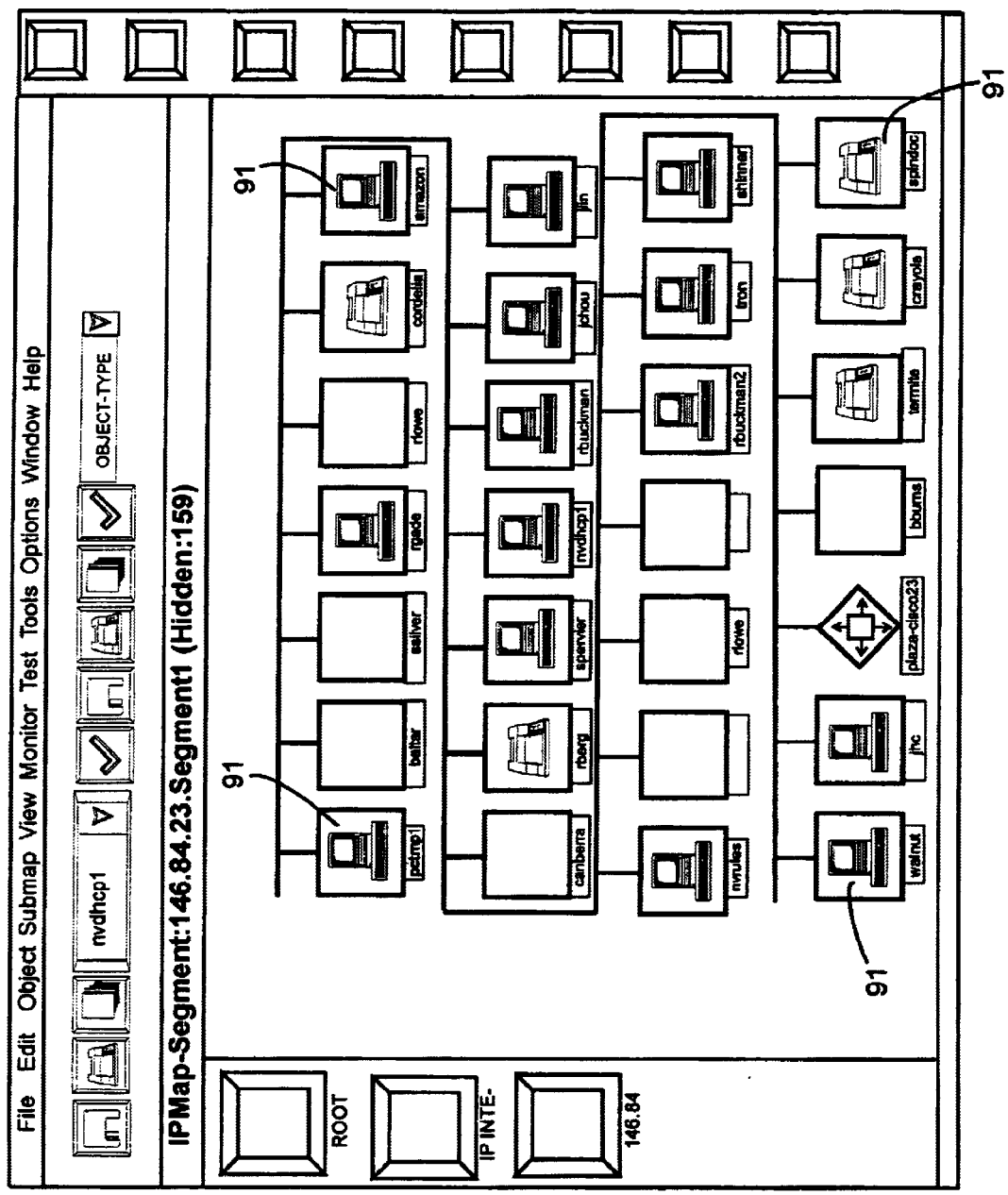

In accordance with an aspect of the present invention, the displayed network objects may be sorted according to any selected attribute. Any conventional sorting routine may be used for this purpose. With reference to FIG. 9, the objects, all of which may be designated 91 for purposes of this description, are to be sorted based upon the "object-type" attribute. The display screen of FIG. 10 shows the network of objects after they are thus sorted.

Figure 11:
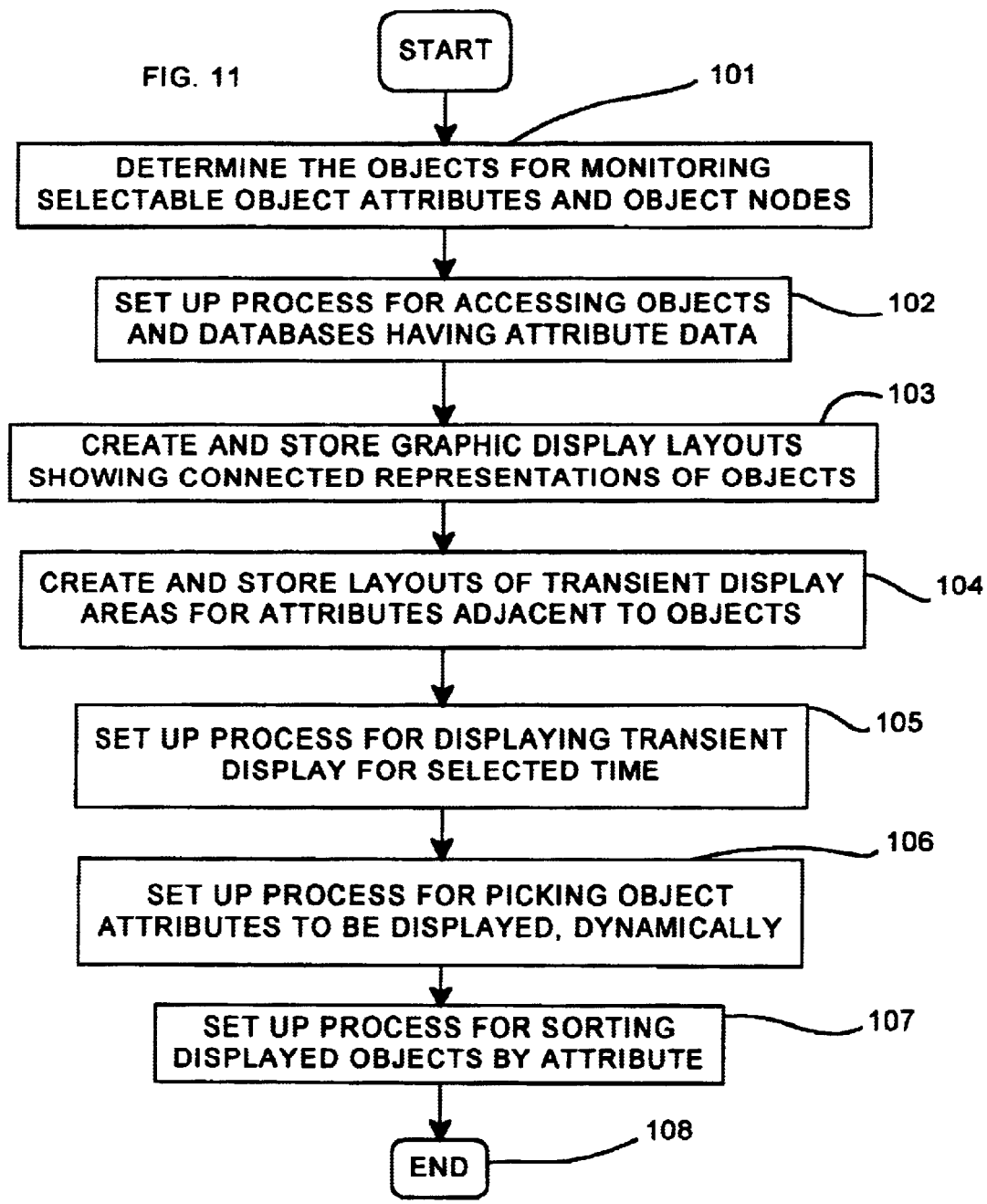
FIG. 11 is a flowchart showing the development of a transient display process of the present invention.
Figure 12:
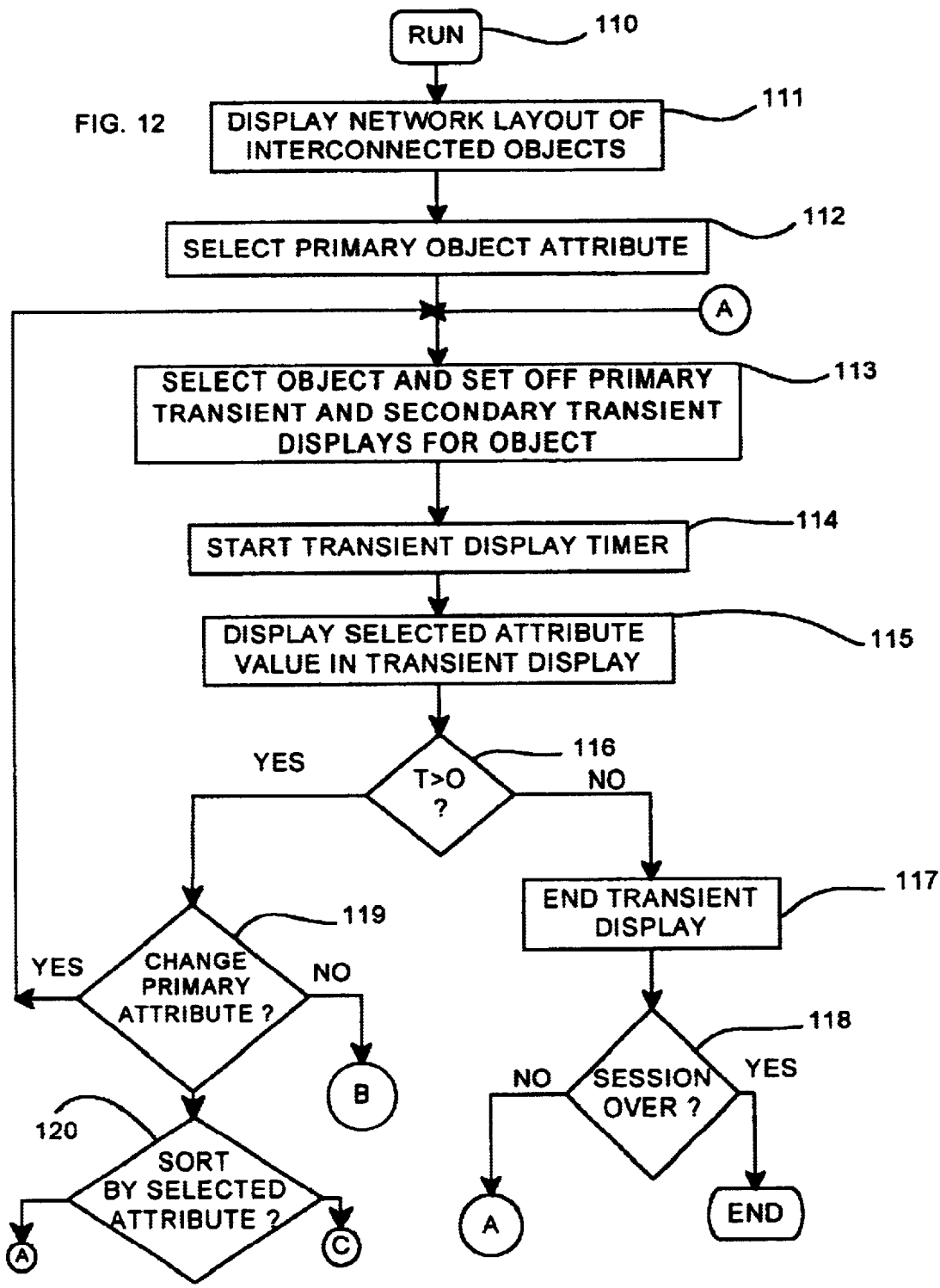
FIG. 12 is a flowchart showing the running of the transient display process described with respect to FIG. 11.
Figure 13:
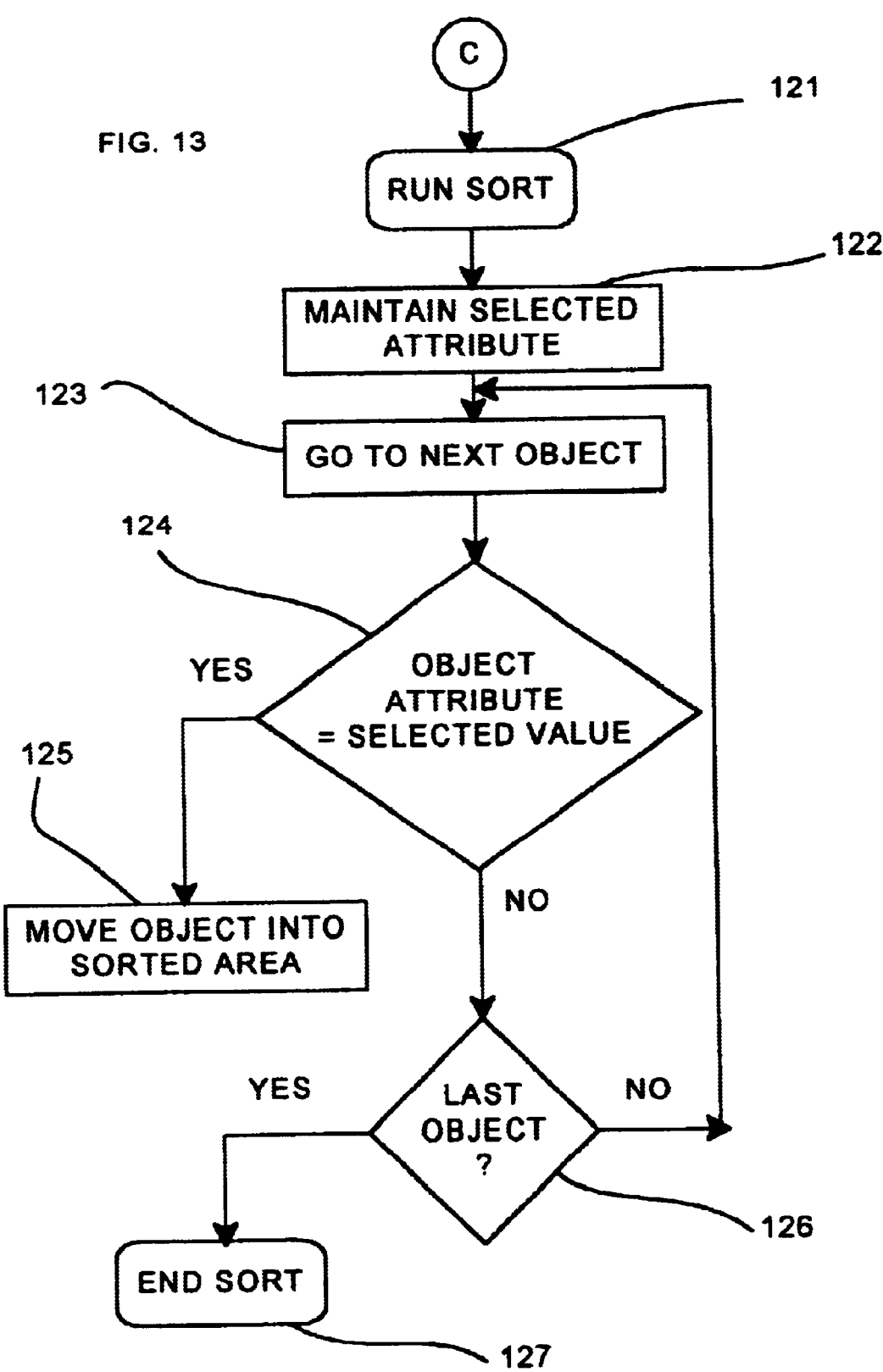
FIG. 13 is a flowchart showing the steps in a general sort routine which may be used in sorting displayed network objects according to values of selected attributes.

Now with reference to FIGS. 11, 12 and 13, we will describe a process implemented by the present invention in conjunction with the flowcharts of these figures. FIG. 11 is a flowchart showing the development of a transient display process of the present invention. FIG. 12 is a flowchart showing the running of the transient display process described with respect to FIG. 11. FIG. 13 is a flowchart showing the steps in a general sort routine which may be used in sorting displayed network objects according to values of selected attributes.

Figure 5:
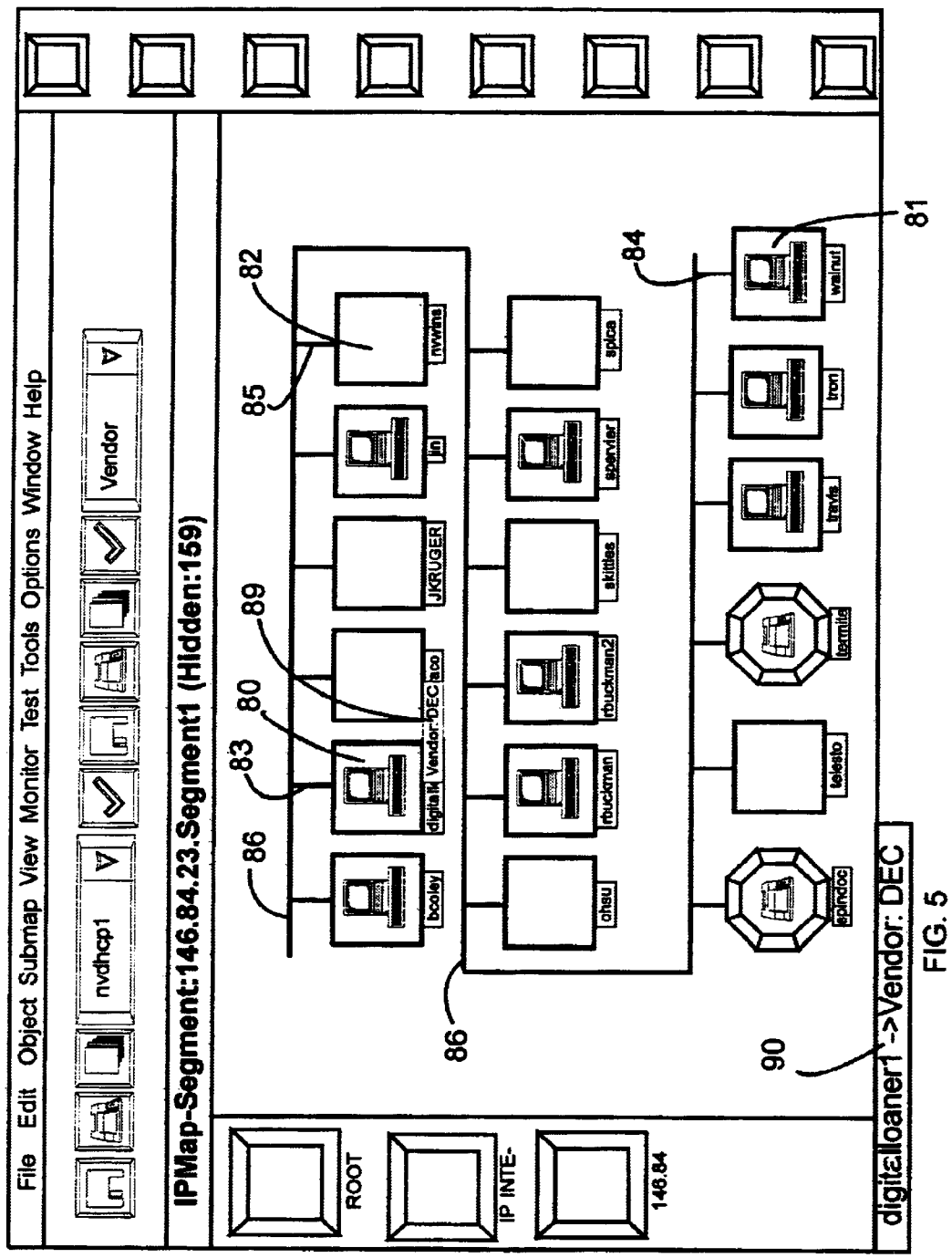
FIG. 5 is the display screen view of FIG. 3 with the value of the selected attribute of a designated object transiently displayed.
Figure 8:
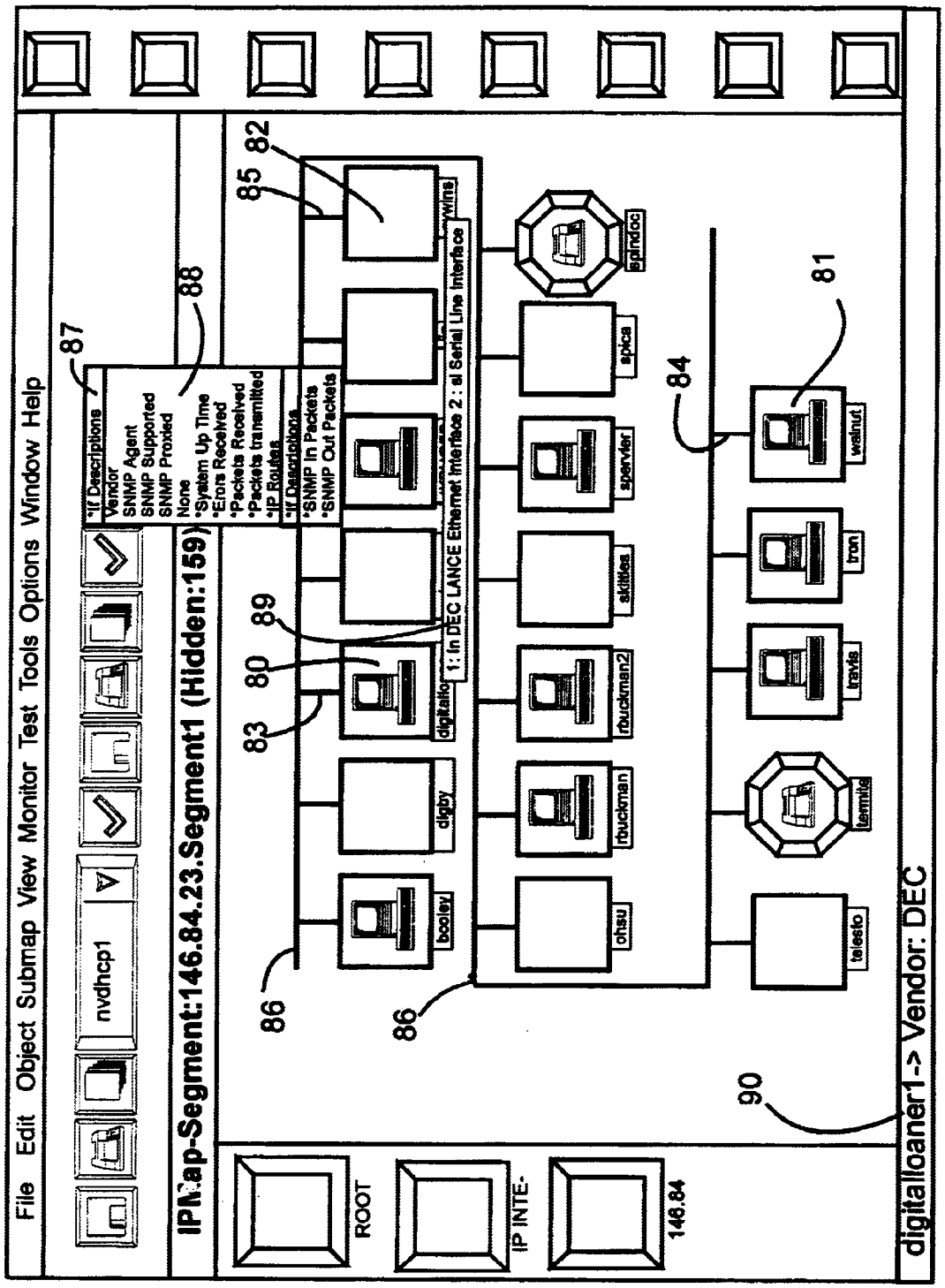
FIG. 8 is the display screen of FIG. 6 with the value of the next selected attribute transiently displayed.

With reference to FIG. 11, first, process step 101, in developing the program, a determination should be made as to which objects are to be monitored for attributes. It could range from a major internet portion objects, FIG. 2, to a local network having a handful of objects. Next, step 102, a program process for accessing the attribute data for the objects is set up. For simplicity in illustration, the attribute data could be considered as stored the databases 71 through 79, FIG. 2, associated with the various-objects. Accessing of the databases and the fetching of attribute data could involve any conventional network routines for data acquisition. The display screen layouts of icons representative of objects together with appropriate interconnections as in the illustrative layouts of FIGS. 3–10 are set up using conventional user interfaces provided by operating systems such as "Windows 95", (a ™ of Microsoft Corp.) or "X-Windows" are created and stored, step 103. Then, step 104, using the same layout design program, layouts for the transient displays such as those in FIGS. 5, 7 and 8 are developed. Then, step 105, a procedure is developed for selecting and controlling the time periods for which the transient displays will be on or for establishing the control events determining the period of the transient display. The control event could be the expiration of a timer or even the movement of a mouse controlled cursor. Also, a procedure is set up through which the user will be able to interactively select through interfaces such as those of FIGS. 3–10, objects and their attributes in a dynamic manner, step 106. Finally, step 107, a process is set up for sorting the displayed network objects according to their attributes.

The process is now set up for operation, some illustrations of which will be now described with respect to FIG. 12. In following some typical routines, the step in FIG. 12 will be given together with a reference to the display screen of FIGS. 3–10 which best illustrates the step. The program is run, step 110, and a network layout is displayed, step 111, as in FIG. 3. Next, step 112, an object attribute is selected as "vendor" in the FIG. 4 display. Then, step 113, an object is selected, object 80, FIG. 5 layout which sets off a transient display of the value of the selected attribute for the selected object, i.e., transient display 89, "Vendor:DEC". At this point, step 114, a process is started for controlling the period during which transient display 89 is maintained. Also, step 115, the appropriate attribute value for the object is obtained and maintained in the transient display. During the time that the transient display is maintained, the time is tracked, decision step 116. If there is time left, t>0, the transient display is maintained, and the flow goes to decision step 119 where a determination is made as to whether the user has changed the attribute before the previous attribute transient display has timed out. If "Yes", then we have the situation illustrated in the screen of FIG. 7 where the user is selecting the "If" attribute while the previous transient display of the "vendor" value is still on. In such a case, the process proceeds back to step 113 where the value of the selected attribute is displayed. Let us assume that the user has not changed the object, and thus as shown in FIG. 8, the value of the new attribute of object 80 is shown in transient display 89. Since the next step 114 sets a new transient display time, a succession of attributes for a selected object may thus be displayed dynamically if the set transient time is long enough for the user to select a subsequent attribute before the time runs out.

Returning now to decision step 116, if there is no time left on the transient display, then the transient display is turned off, step 117, FIG. 12 and the procedure moves to decision step 118 where a determination is made as to whether the session is over. If Yes, then it is ended. If No, then the session is returned to step 113 via branch "A" and the above procedure is repeated. Then if in the course of this procedure, step is reached again and if the user does not change the attribute, i.e., the decision from step 119 is No, then the user may at this point wish to sort the displayed objects according to this attribute. The decision from step 120 is thus Yes and the flow branches via entry "C" to the sort routine of FIG. 13. If the decision from step 120 is No, then the flow return to step 113 via branch "A".

At this point let us consider how a simple sort could be run if the decision from decision step 120 were Yes. Step 121, FIG. 13, the sort commences. The selected attribute is maintained, step 122 which in the case of the network display screen of FIG. 9 would be object-type. An object-type first value would be selected and the process would go to next object, step 123, on which, decision step 124, a determination would be made as to whether it had the selected value. If Yes, then, step 125, the object icon would be moved to the screen area in which the sorted object icons having the selected value were to be stored. After each object sort step, a decision, step 126, would have to made as to whether the sorted object was the last. If Yes, the sort would be terminated, step 127. If No, then the process would be returned to step 123 and the sort continued. After the completion of the sort, there would be the sorted arrangement shown on the screen of FIG. 10.

Although certain preferred embodiments have been shown and described, it will be understood that many changes and modifications may be made therein without departing from the scope and intent of the appended claims.

What is claimed is:

1. In a computer managed communication network with user interactive access via a plurality of display terminals and including a plurality of network objects, each respectively associated with one of a plurality of linked network nodes, means for storing data representing attributes of said network objects, means for graphically displaying on at least one of said display terminals, at least a portion of said linked network nodes and associated objects, user interactive means for activating for a selected time period a transient display of a selected attribute of one of said displayed objects proximate to said object, and user interactive means for selecting the attribute to be transiently displayed.

2. The computer managed communication network of claim 1 further including means for dynamically selecting said attribute to be displayed comprising user interactive means for activating the display of an attribute menu during the time of said transient display whereby another attribute may be selected during said time.

3. The computer managed communication network of claim 1 further including means, responsive to said means for activating said transient display, for dynamically determining the value of the selected attribute from said stored data representing attributes.

4. The computer managed communication network of claim 1 further including means for displaying the selected attribute of said transient display in a portion of said display apart from said transient display and beyond the duration of said transient display.

5. The computer managed communication network of claim 4 wherein said display of said selected attribute beyond said transient display is maintained until another transient display of an object is activated.

6. The computer managed communication network of claim 1 further including means for sorting said displayed network objects according to the value of a selected attribute whereby the said transient display may be activated for said displayed network objects in the order of said sort.

7. A method for determining the status of attributes of a plurality of network objects each respectively associated with one of a plurality of linked network nodes in a computer managed communication network with user interactive access via a plurality of display terminals comprising storing data representing attributes of said network objects, graphically displaying on at least one of said display terminals, at least a portion of said linked network nodes and associated objects, selecting an attribute to be transiently displayed, and activating for a selected time period a transient display of said selected attribute of one of said displayed objects proximate to said object.

8. A method according to claim 7 further including the step of dynamically selecting said attribute to be displayed by activating the display of an attribute menu during the time of said transient display whereby another attribute may be selected during said time.

9. A method according to claim 7 further including the step, responsive to said activating of said transient display, of dynamically determining the value of the selected attribute from said stored data representing attributes.

10. A method according to claim 7, further including the step of displaying the selected attribute of said transient display in a portion of said display apart from said transient display and beyond the duration of said transient display.

11. A method according to claim 10 wherein said display of said selected attribute beyond said transient display is maintained until another transient display of an object is activated.

12. A method according to claim 7 further including the step of sorting said displayed network objects according to the value of a selected attribute whereby the said transient display may be activated for said displayed network objects in the order of said sort.

13. A computer program for a computer managed communication network with user interactive access via a plurality of display terminals and including a plurality of network objects, each respectively associated with one of a plurality of linked network nodes, said program having data structures included on a computer readable medium comprising means for storing data representing attributes of said network objects, means for graphically displaying on at least one of said display terminals, at least a portion of said linked network nodes and associated objects, user interactive means for activating for a selected time period a transient display of a selected attribute of one of said displayed objects proximate to said object, and user interactive means for selecting the attribute to be transiently displayed.

14. The computer program according to claim 13 further including means for dynamically selecting said attribute to be displayed comprising user interactive means for activating the display of an attribute menu during the time of said transient display whereby another attribute may be selected during said time.

15. The computer program according to claim 13 further including means, responsive to said means for activating said transient display, for dynamically determining the value of the selected attribute from said stored data representing attributes.

16. The computer program according to claim 13 further including means for displaying the selected attribute of said transient display in a portion of said display apart from said transient display and beyond the duration of said transient display.

17. The computer program according to claim 16 wherein said display of said selected attribute beyond said transient display is maintained until another transient display of an object is activated.

18. The computer program according to claim 13 further including means for sorting said displayed network objects according to the value of a selected attribute whereby the said transient display may be activated for said displayed network objects in the order of said sort.

\* \* \* \* \*